Jan. 1, 1929.
S. E. MAUNEY
1,697,775
CULTIVATOR
Filed Feb. 7, 1927
2 Sheets-Sheet 1
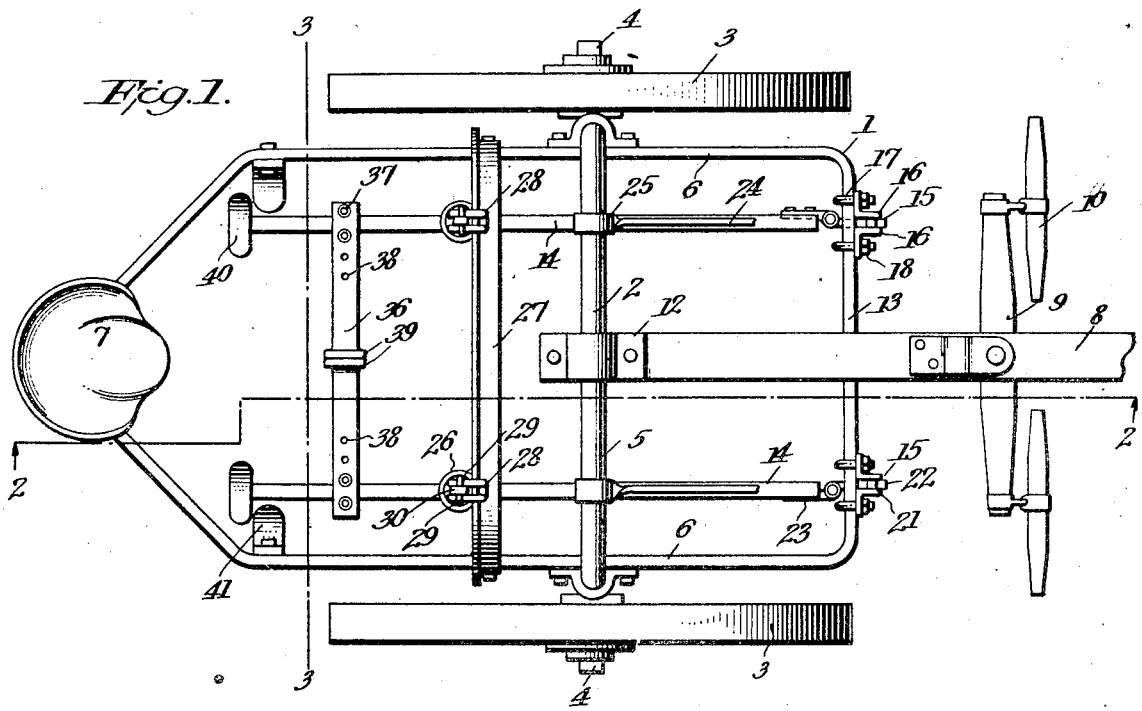
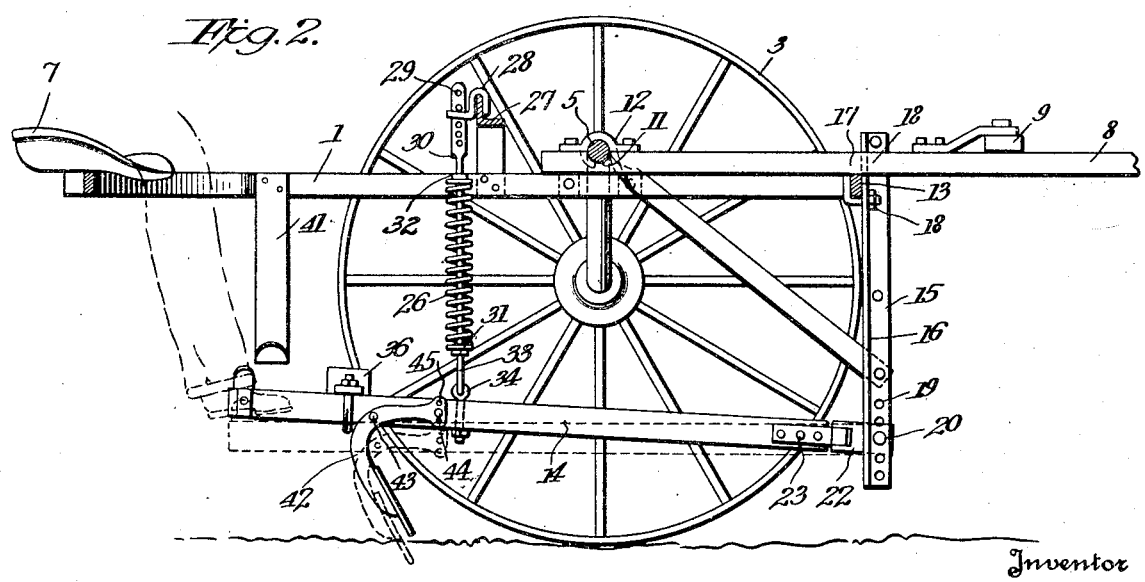
Inventor
Samuel E. Mauney Jan. 1, 1929.
S. E. MAUNEY
1,697,775
CULTIVATOR
Filed Feb. 7, 1927    2 Sheets-Sheet 2
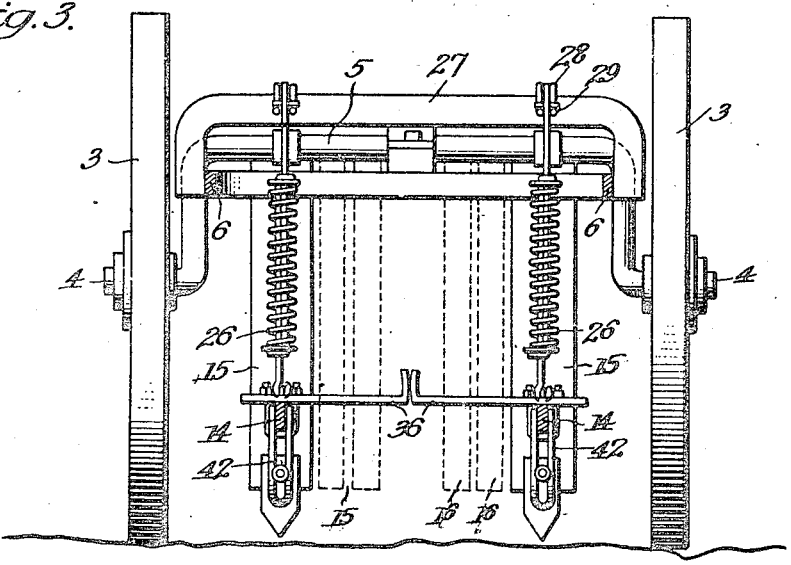
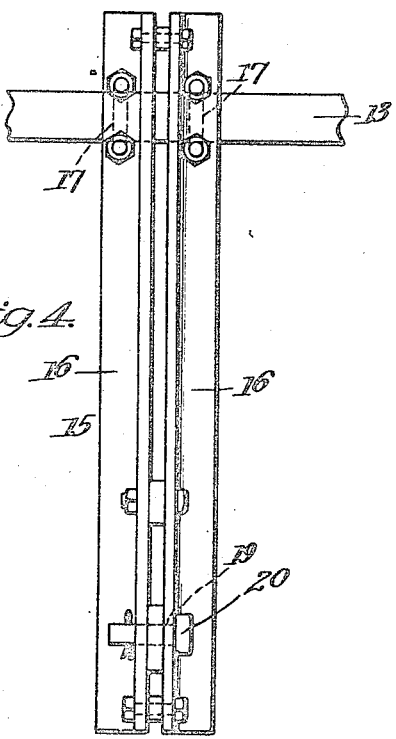
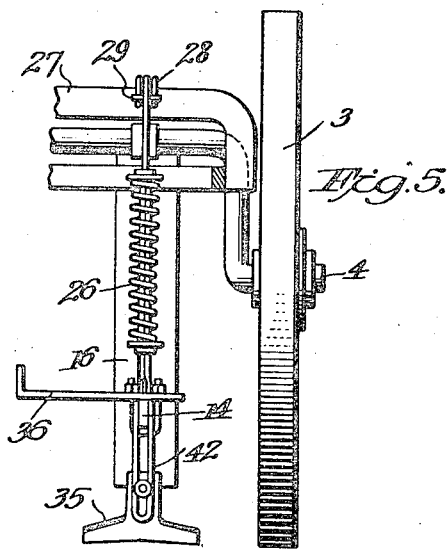
Inventor
Samuel E. Mauney
By
Attorney Patented Jan. 1, 1929.

1,697,775

UNITED STATES PATENT OFFICE.

SAMUEL E. MAUNEY, OF GAINESVILLE, GEORGIA.

CULTIVATOR.

Application filed February 7, 1927. Serial No. 166,444.

This invention relates to improvements in cultivators and, more particularly, to the single-row type of cultivator in which two plows or rows of plows are employed, one for working the ground at either side of a row of, for instance, cotton.

An object of the invention is to provide a cultivator wherein the action of each plow beam is independently controllable by a foot of the operator without the use of levers or the like, whereby the hands of the operator are both free for driving.

A further object of the invention is the provision of a cultivator wherein the plow beams are hingedly connected at their forward ends to the frame to permit both vertical and lateral swinging movement thereof and are yieldingly and adjustably supported adjacent their rear ends.

A further object of the invention is the provision of a cultivator having improved adjustable means for limiting the movement of the rear ends of the plow beams toward each other, and also with means for supporting the plow beams up out of operative position, as when driving from one field to another.

A still further object of the invention is the provision of a riding cultivator so designed that the under portion of the apparatus is clear except for the plow beams and yielding support therefor, whereby the driver's view of the ground and of the cotton or the like being cultivated is unobscured.

With these and other objects in view, as will appear as the description proceeds, the invention consists of the novel features of construction, combinations of elements and arrangements of parts as hereafter fully described and pointed out in the claims.

A full and complete understanding of the invention may be obtained from a consideration of the accompanying drawings forming a part of the disclosure; it being understood that while the drawings show a practical form of the invention, the latter is not confined to the showing thereof, but may be changed and modified so long as such changes and modifications mark no material departure from the salient features of the invention as hereinafter fully described and claimed.

In these drawings:

Figure 1 is a view in top plan of a cultivator involving the features of this invention;

Figure 2 is a longitudinal, vertical, section view taken on the line 2—2 of Fig. 1; the plow beam being shown in solid lines in normal or elevated position and in dotted lines in working position;

Figure 3 is a transverse, vertical, section view taken on the line 3—3 of Fig. 1; certain of the parts being shown in different positions by full lines and dotted lines, respectively;

Figure 4 is an enlarged detail view illustrating the manner in which the front ends of the plow beams are supported from the frame; and Figure 5 is a fragmentary detail view illustrating a portion of the cultivator with a different form of implement carried by the plow arms.

In the embodiment of the invention illustrated in the accompanying drawings, the numeral 1 designates a frame of the cultivator, which is supported upon the shaft 2 upon opposite ends of which are mounted wheels 3. As shown, the shaft 2 comprises two axle portions 4 carrying the wheels and an offset central portion 5 passing over side members 6 of the frame. The frame 1 preferably is substantially rectangular in form and supports a driver's seat 7 centrally at the rear thereof. A tongue 8, carrying the usual doubletree 9 and swingletrees 10, is made fast to the center of the shaft 2 by having its inner end grooved, as at 11, to receive the shaft, and by a cap piece 12 overlying the shaft and bolted to the tongue. The tongue 8 passes over and is secured to the center of the front portion 13 of the frame 1. Means are provided for supporting the forward ends of plow beams 14 at varying distances from the frame 1 and from the ground. As shown, these means comprise a pair of vertical members 15 depending from portion 13 of the frame so as to be movable towards and from each other thereon. Each member 15 preferably comprises a pair of angle elements 16 riveted together in spaced relation to constitute in effect a single element having a central longitudinal slot. A U-bolt 17 passing around the frame portion 13 serves to hold each element 16 fast to the frame while permitting, upon loosening of the nuts 18, the sliding of the upper end of the member 15 on the frame. A series of apertures 19 are provided in each member 15 to selectively receive a coupling pin 20, preferably of wood to constitute a break pin, which passes through an aperture 21 in a hinge element 22 carried by the forward end of the plow beam 14, the other element 23 of the hinge being made fast in the usual manner to the plow beams.

It will be observed that, by reason of the construction just described, the forward ends of the plow beams 14 are adjustable vertically as well as to and from each other, and each plow beam is pivoted to swing in a horizontal plane about an axis adjacent the member 15. Preferably and as shown, braces 24 extend from each member 15 to the shaft 2, the upper ends of these braces being curved about the shaft, as at 25, in order to be slidable thereon as the members 15 are moved to and from each other.

In order that the plow beams, particularly the rear ends thereof, may be yieldingly supported at any desired height, compression springs 26 are disposed between a stationary part of the frame and the plow beams. As shown, a U-shaped angle bar 27 extends upwardly from and is fast to the side members 6 of the frame and slidably supports a pair of hook members 28, the horizontal portions of which engage selectively under pairs of pins 29 carried by the top portion of the bars 30. The bars 30 extend through the compression springs 26 and the enlarged lower ends thereof engage the lower ends of the springs. The enlarged ends 32 of rods 33 engage the upper ends of the springs 26 and the lower ends of the rods 33 attach to eye-bolts 34 fast at an intermediate point to the plow beams 14.

It will be observed that, by reason of this construction, the rear ends of the plow beams 14 may be yieldingly supported in a plurality of positions and that should one of the plows 35 engage a tree-stump, or a like obstacle, and the rear end of the plow beam be raised thereby, the rod 30 will easily become disengaged from the hook members 28 and the pin 20 will, when the strain is sufficient, break and wholly release the plow beam from the frame and thereby prevent injury to the apparatus.

While it is desirable for the operator to be able to control movement of the plows entirely with his feet, it is helpful, in some kinds of work, to limit the inward movement of the plows toward each other. For this purpose, spreader elements 36 are provided and comprise L-shaped arms securable in adjustable positions adjacent one end of the plow beams 14 as by U-bolts 37 selectively positionable in any pair of apertures 38 so that the vertical portions 39 of the spreader elements engage each other and limit the inward movement of the plow beams. It will be observed that the spreader elements do not interfere with the independent action of the plow beams except to limit their inward movement, that is, movement toward each other, and these elements may be removed or loosened and turned into alinement with the beams when not needed.

The usual pieces 40 are provided on the rear ends of the plow beams for engagement by the foot of the operator and, preferably and as shown, foot rests 41 depend from the frame 1 in such position that the plow beams 14 may be raised and rested thereon, as for instance when the apparatus is out of operation for, say, driving from one field to another.

Preferably and as shown, a curved plow foot 42 is pivotally attached to each plow beam 14, as by a bolt or rivet 43, and may be made fast in adjusted positions by means of a second bolt 44 passing through the beam and, selectively, through one of the pairs of apertures 45 in the enlarged bifurcated end 46 of the plow foot.

From the foregoing, it will be observed that there has been provided a cultivator wherein the action of each plow beam is entirely controllable by one foot of the operator, the plow beams may be yieldingly mounted in any desired position with respect to each other; the apparatus is so arranged that no portion thereof obscures the driver's view in the operation thereof, and the plow beams are independently adjustable in all directions to cause them to function properly for varying grades of work and for various different forms of plows, sweeps and the like which may be employed therewith.

What I claim is:

1. A cultivator including a wheeled frame, a pair of plow beam supporting-members depending from the frame, a pair of plow beams pivotally connected to the respective members by a releasable connection, and means on the frame yieldingly and releasably supporting the plow beams whereby, upon engagement of a plow carried by one of the beams with an obstacle, the releasable connection and the yielding support will be released and the beam be thereby entirely freed of the plow frame.

2. A cultivator comprising a frame, a shaft including a pair of axle portions and an offset portion fast to and overlying side portions of the frame, wheels mounted on the axles, beam supporting members depending from the front portion of the frame so as to be adjustable to and from each other, braces fast at their lower ends to the supporting members and slidably mounted at their upper ends on the offset portion of the shaft so as to move thereon when the supporting members are moved with respect to the frame, plow beams pivotally connected at their forward ends to the respective supporting members, and means for yieldingly supporting the rear ends of the plow beams from the frame.

3. A cultivator comprising a wheeled frame, a pair of beam supporting members depending from the front portion of the frame, plow beams having pivotal and hinged connection at their forward ends to the respective members to permit movement of the beams in both vertical and horizontal planes, means for yieldingly supporting the rear ends of the plow beams from the frame, and means depending from opposite sides of the frame which serve both as foot rests and as means for supporting the rear ends of the plow beams up out of operative position.

4. A cultivator comprising a wheeled frame, a pair of plow beam supports depending from the front portion of the frame, plow beams having pivotal connection at their forward ends to the respective supports, and spring means for supporting the rear ends of the beams yieldingly in adjusted positions, said means including a connection intermediate the beams and frame which remains fixed under ordinary operating conditions but readily becomes disconnected when undue strain is brought to bear upon the beams.

In testimony whereof I affix my signature.

SAMUEL E. MAUNEY.